R. VUILLEUMIER.
HIGH PRESSURE VALVE.
APPLICATION FILED JULY 30, 1917.
1,360,833.
Patented Nov. 30, 1920.
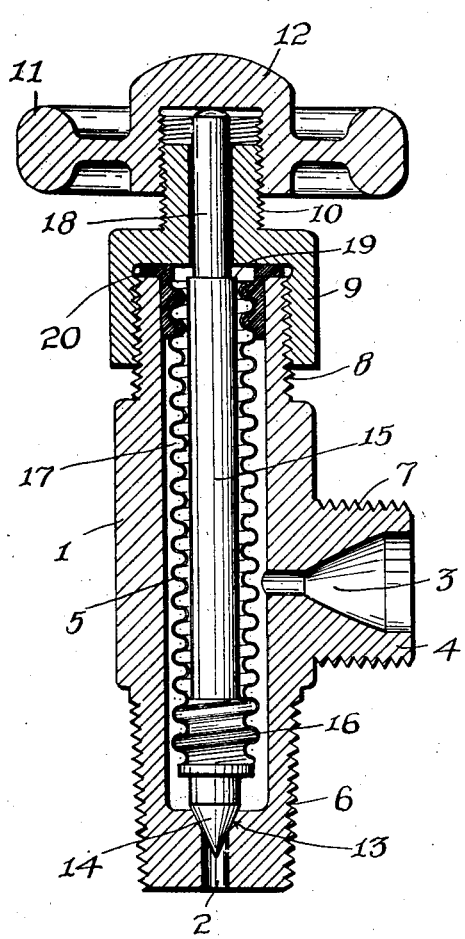
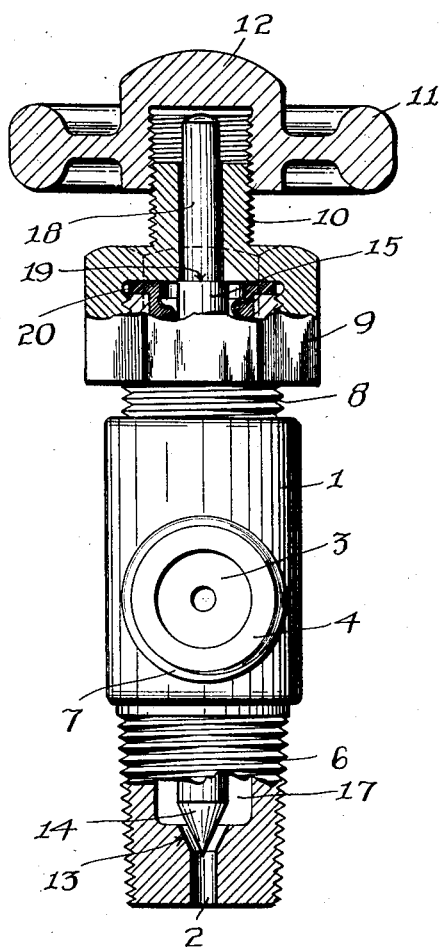
INVENTOR:
Rudolph Vuilleumier
BY Chas. M. Chapman,
ATTORNEY.

UNITED STATES PATENT OFFICE.

RUDOLPH VUILLEUMIER, OF NEW ROCHELLE, NEW YORK, ASSIGNOR TO SAFETY CAR HEATING & LIGHTING COMPANY, A CORPORATION OF NEW JERSEY.

HIGH-PRESSURE VALVE.

1,360,833.     Specification of Letters Patent.     Patented Nov. 30, 1920.

Application filed July 30, 1917. Serial No. 183,479.

*To all whom it may concern:*

Be it known that I, RUDOLPH VUILLEUMIER, a citizen of the United States, residing in New Rochelle, county of Westchester, and State of New York, have invented a new and useful Improvement in High-Pressure Valves, of which the following is a description.

This invention relates to high pressure valves and, particularly, to a means for hermetically sealing valves or valve-stems in high pressure, fluid apparatus.

Among the objects of my invention may be noted the following: to provide a valve-structure wherein the usual packing about the valve-stem is replaced by an elastic member which is hermetically sealed to the stem; to provide a valve-structure wherein means are embodied for hermetically sealing the stem of the valve and which permit a liberal valve lift under regulation; to provide a valve-structure wherein the valve-stem is sealed by an elastic or resilient member operating normally to lift the valve, and which is sustained and maintained in proper working condition by the valve-stem; and to incorporate in a high pressure valve-structure the foregoing characteristics through the medium of simple, compact and inexpensive means.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a longitudinal section of a high pressure valve-structure embodying my invention; and Fig. 2 is a sectional elevation of the structure embodied in Fig. 1, parts of the figure being broken away and shown in section for the purpose of illustrating an open position of the valve, Fig. 1 showing the closed position.

Primarily, it should be understood that high pressure valves have usually been provided with stem packings, and other similar media, for preventing leakage; but, that, in all instances known to me, such packing and media have been failures and leakage has inevitably occurred. Furthermore, several kinds of low pressure and other valves have been provided with elastic members for the purpose of sealing the stems thereof; but, so far as known to me, the structures were suitable only for low working pressures due to the construction and disposition of the elastic member; and, where sufficient strength has been provided in the elastic sealing member, the elasticity thereof has been greatly reduced resulting in a very limited valve lift. Consequently, the valve area has been greatly enlarged to provide the necessary valve opening, resulting in making a tight closure of the valve difficult and calling for unusual efforts on the part of the operator to manipulate the valve.

To overcome the foregoing objections and produce a high pressure valve structure, I have produced a valve mechanism and embodied therein a very light, elastic sealing member which makes possible the construction of a compact, inexpensive, high pressure valve having all the advantages of valves provided with stem packings and none of the disadvantages due to inevitable leakage and the close attention required in the use of stem packed valves, and also enabling a valve hermetically sealed by an elastic member to be easily and readily operated, even under the very high pressures commonly encountered in connection with compressed gases, such as oxygen, hydrogen, etc.

Referring to the drawings, the numeral 1 indicates the valve-body which may be of any suitable or preferred form or design; but, which, in this instance of my invention, is provided with a port 2 in substantially the longitudinal axis of the valve-body, and a port 3 formed, in this instance of my invention, in a hub projection or lateral extension 4 of the valve-body and extending at a right-angle to, and entering, the valve-chamber 5. At the port end 2 of the valve-body, the latter is externally screw-threaded, as at 6, so that the latter may be readily tapped into a fluid tank or other holder; and the extension 4 is likewise screw-threaded, as at 7, for similar purpose. At its other end, the valve-body is exteriorly screw-threaded, as at 8, to receive the screw-threaded portion of the nut 9 having the reduced, exteriorly screw-threaded extension 10, to which is applied the valve-controlling member 11, in this instance of my invention, in the form of a hand wheel, having one end of its hub 12 closed or barred for controlling the valve, as presently described. At the inner end of the port 2 of the valve-body, a valve-seat 13 is provided, see Fig. 2, with which coöperates a conical end 14 of the valve-stem 15, said end being elongated so as to remain within the port in the normally open position of the stem, thus insuring the proper reseating of said stem. Near one end, the stem 15 is provided with the screw-threaded enlargement 16 adapted to have screwed thereon one end of the elastic or resilient sealing member 17 composed of a light metal corrugated helically throughout its length, said member thereby having imparted to it a high degree of resiliency or elasticity. The said sealing member is hollow throughout its length, and, at the place of attachment to the screw-threaded enlargement 16 of the valve-stem, is soldered or otherwise hermetically sealed to said stem; and the said stem in diameter is but little less than the interior diameter of the elastic member 17, permitting the stem to slide freely within the said member and providing for the latter a strong support throughout its length, as will be readily understood upon reference to Fig. 1. In this manner, the valve-stem and elastic member are combined so as to fortify said member and prevent it from being deflected or collapsed in any manner by the high pressures to which the same my be subjected in use. This is an important feature of my invention and may be accomplished in various ways; that is, the resilient member, broadly, is to be sustained in some manner to avoid collapse whether the pressure thereon be internal or external. At its opposite end, the valve-stem 15 is provided with a reduced extension 18 operating through the screw-threaded extension 10 of the nut 9, and into the hub of the wheel 11, so as to be engaged by the barred portion 12 of said wheel. The reduced extension 18 of the valve-stem provides the shoulder 19 within the body portion of the nut 9, which is adapted to coöperate with the end wall of the nut surrounding the reduced extension. Within the valve-body and surrounding the shoulder 19 of the valve-stem is a flanged gland 20, the body of which is internally screw-threaded to receive the adjacent helical end of the elastic member 17, the parts being hermetically sealed together in any suitable way. The gland, by its flanged portion, is clamped between the end of the valve-body and the inner end of the body of the nut 9, see Fig. 1, thus holding the gland in position and likewise maintaining the position of the connected end of the elastic member.

It will now be understood that the elastic member 17, by reason of its helical corrugations, will contract and expand longitudinally, and that, normally, its tendency is to contract longitudinally, and, by reason of its connection to the valve-stem at 16, lift the conical end thereof from the seat 13, this position being shown in Fig. 2, wherein the hand wheel 11 has been turned to provide ample clearance between the barred member 12 and the adjacent end of the valve-stem, so that the shoulder 19 may engage the end of the nut 9, thus limiting the unseating movement of the valve-stem. Control of the valve-opening is provided for by turning the hand wheel upon the nut 9, so as to cause the barred member 12 to engage the reduced end 18 of the valve-stem and set the conical end of the latter in any position or relation desired, with reference to the valve-seat, or to seat said conical end, as shown in Fig. 1.

The valve-stem is hermetically sealed by the connection thereto of the elastic member and the connection of the latter to the gland 20; and the gland end of the valve-body is thoroughly sealed by the nut 9 holding the gland as previously described.

The length of the elastic member 17 is so chosen that the valve is normally held in open position, as shown in Fig. 2, and it will be understood that, as pressure is applied, the valve-stem is automatically forced against the nut 9, or against the barred member 12 of the hand wheel 11. The movement of the valve-stem is limited by the engagement of shoulder 19 against the inner end of the nut 9.

From the foregoing detail description, it will be seen that the elastic member is so formed that it can be readily jointed to the valve-stem and to the gland, and that the joints can be given the required strength to support the high pressure to which they are subjected. Moreover, a rigid supporting means is provided to reinforce the elastic member, preventing it from being distorted or collapsed or ruptured under the high pressure to which it is subjected, and this without impairing its desired degree of elasticity. The form of the elastic member is inexpensive to produce, since it can be formed, in one operation, in long lengths to be subsequently divided into a number of individual members. It will also be seen that the entire valve-structure is simple, inexpensive, strong and durable.

Having thus described my invention, what I claim and desire to secure by Letters Patent is:

1. In combination with the valve body having a port and a valve stem; means restricting the movement of the stem in the body so that one end thereof shall be always in said port; a sealing member normally holding said stem lifted to its limit and consisting of a corrugated tube formed of resilient metal closely encircling the stem, whereby the one fortifies the other, and said member is prevented from being deflected or collapsed.

2. In combination with a high pressure valve-body and the stem thereof, a resilient helically corrugated metallic sealing member closely fitting said stem, means for sealing one end of said member directly to the valve-stem, a gland surrounding said stem, means for securing the gland to the valve-body, and means for sealing the other end of the member to the said gland.

3. A high pressure valve having in combination a valve-stem, a seat therefor, said stem being provided with a screw-threaded enlargement, and a resilient corrugated sealing member coöperating at one end with the screw-threaded enlargement, and at its other end having means for sealing the stem within the valve-body.

4. A high pressure valve consisting of a tubular body member having at one end a valve seat, in combination with a valve stem, one end of which is formed to coöperate with the valve seat; means tending to normally lift said stem to its limit comprising a tubular, corrugated, resilient, sealing member secured at one end to the stem and closely engaging the latter throughout its length so that one reinforces the other against lateral pressure, and means for securing the sealing member to the valve body independently of the valve stem.

5. A high pressure valve comprising a tubular body having a valve seat; a valve stem extending through the body and coöperating with the seat; and a corrugated resilient sealing member secured to the valve body and also secured to the valve stem and normally tending to hold said stem lifted from the valve seat.

6. A high pressure valve comprising a tubular body member, having a valve seat; a valve stem coöperating with the seat; a resilient member surrounding the valve stem and sealed thereto at one end and normally tending to hold said stem unseated; means for sealing the member to the valve body; and means coöperating with the valve stem for controlling the position thereof relatively to the valve seat.

7. A high pressure valve comprising a tubular body; a stem extending therethrough; a sealing member for the stem secured to the latter at one end and to the valve body at the other end and normally tending to hold the stem unseated; the sealing member and stem being closely related so that the one sustains and reinforces the other; and means for controlling the position of the valve stem.

8. A high pressure valve body having a lateral port and end seat; a uniform valve stem working in said body throughout the length of its chamber; and a resilient member coöperating with said stem throughout the length of said member and closely fitting said stem and chamber, whereby said member is sustained against collapse by lateral pressure through said port.

RUDOLPH VUILLEUMIER.